US008985513B2

(12) United States Patent
Dean et al.

(10) Patent No.: US 8,985,513 B2
(45) Date of Patent: Mar. 24, 2015

(54) HONEYCOMB CORES WITH SPLICE JOINTS AND METHODS OF ASSEMBLING HONEYCOMB CORES

(71) Applicant: The Boeing Company, Seal Beach, CA (US)

(72) Inventors: Thomas A. Dean, Maple Valley, WA (US); Noel T. Gerken, Maple Valley, WA (US); Frederick Leonard Knoll, Kent, WA (US); Kurt Walter Withnell, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 100 days.

(21) Appl. No.: 13/919,182

(22) Filed: Jun. 17, 2013

(65) Prior Publication Data

US 2014/0367512 A1 Dec. 18, 2014

(51) Int. Cl.
| | | |
|---|---|---|
| *B64C 3/00* | (2006.01) | |
| *B64C 1/40* | (2006.01) | |
| *B32B 3/12* | (2006.01) | |
| *B32B 37/12* | (2006.01) | |
| *B32B 7/12* | (2006.01) | |
| *G10K 11/16* | (2006.01) | |

(52) U.S. Cl.
CPC ... *B64C 1/40* (2013.01); *B32B 3/12* (2013.01); *B32B 37/1207* (2013.01); *B32B 7/12* (2013.01); *G10K 11/16* (2013.01)
USPC ............... 244/123.13; 29/896.2; 181/292; 428/116; 156/304.1

(58) Field of Classification Search
None
See application file for complete search history.

(56) References Cited

U.S. PATENT DOCUMENTS

| | | | |
|---|---|---|---|
| 4,054,477 A * | 10/1977 | Curran | 156/197 |
| 4,557,773 A * | 12/1985 | Bonzo | 156/64 |
| 5,154,963 A * | 10/1992 | Terry | 428/116 |
| 5,188,879 A * | 2/1993 | Hill et al. | 428/117 |
| 5,445,861 A * | 8/1995 | Newton et al. | 428/116 |
| 5,455,096 A * | 10/1995 | Toni et al. | 428/116 |
| 5,500,269 A * | 3/1996 | Terry | 428/116 |
| 5,776,579 A | 7/1998 | Jessup et al. | |
| 6,565,942 B2 * | 5/2003 | Anderson et al. | 428/73 |
| 6,688,558 B2 * | 2/2004 | Breer et al. | 244/134 R |
| 6,698,691 B2 * | 3/2004 | Porte | 244/134 B |
| 6,711,872 B2 * | 3/2004 | Anderson | 52/783.17 |
| 7,854,298 B2 * | 12/2010 | Ayle | 181/292 |
| 8,084,114 B2 * | 12/2011 | Grose et al. | 428/73 |
| 8,176,635 B2 * | 5/2012 | Queheillalt et al. | 29/897.31 |
| 8,251,174 B2 * | 8/2012 | Welch et al. | 181/292 |
| 2005/0115070 A1 * | 6/2005 | Sugimoto et al. | 29/890 |
| 2007/0054087 A1 * | 3/2007 | Smith et al. | 428/116 |

(Continued)

FOREIGN PATENT DOCUMENTS

| | | |
|---|---|---|
| EP | 0 798 107 | 10/1997 |
| FR | 2 557 932 | 7/1985 |

OTHER PUBLICATIONS

Machine-generated English translation of FR 2 557 932.

*Primary Examiner* — Christopher P Ellis
*Assistant Examiner* — Medhat Badawi
(74) *Attorney, Agent, or Firm* — DASCENZO Intellectual Property Law, P.C

(57) ABSTRACT

Honeycomb cores for use in aerospace applications include two honeycomb core sections operably joined at a splice joint, the splice joint defined by a foam adhesive that is sandwiched between a sheet of film adhesive. Methods of assembling honeycomb cores also are disclosed herein.

20 Claims, 7 Drawing Sheets

(56) References Cited

U.S. PATENT DOCUMENTS

| | | | |
|---|---|---|---|
| 2008/0171170 A1* | 7/2008 | Fabreguette | 428/40.1 |
| 2009/0081400 A1* | 3/2009 | Wolf et al. | 428/57 |
| 2009/0258185 A1* | 10/2009 | Holland et al. | 428/116 |
| 2009/0286100 A1* | 11/2009 | Wadley et al. | 428/593 |
| 2010/0006702 A1* | 1/2010 | Fogarty et al. | 244/131 |
| 2010/0095622 A1* | 4/2010 | Niemoller | 52/407.5 |
| 2012/0037449 A1* | 2/2012 | Ayle | 181/292 |
| 2013/0248160 A1* | 9/2013 | Eplee | 165/165 |
| 2013/0341119 A1* | 12/2013 | Ichihashi | 181/207 |
| 2014/0013601 A1* | 1/2014 | Ayle | 29/896.2 |
| 2014/0034417 A1* | 2/2014 | Ayle et al. | 181/292 |

* cited by examiner

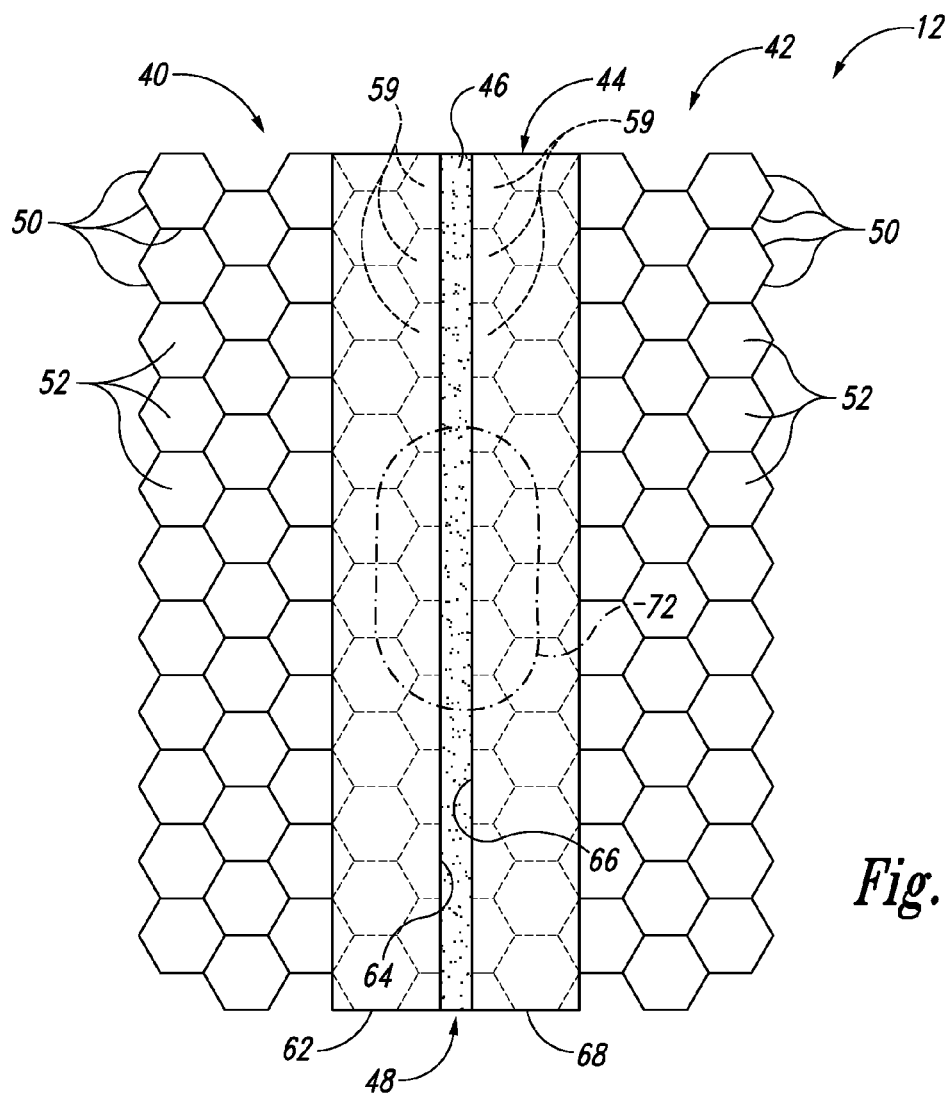
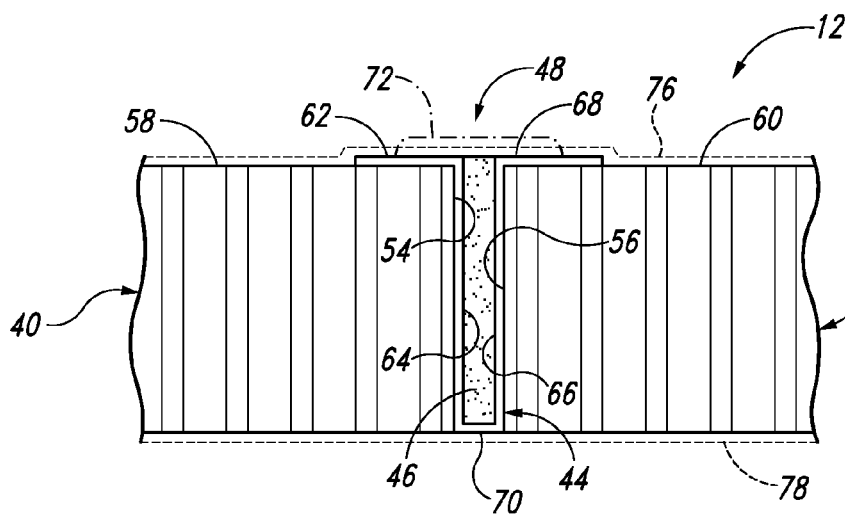

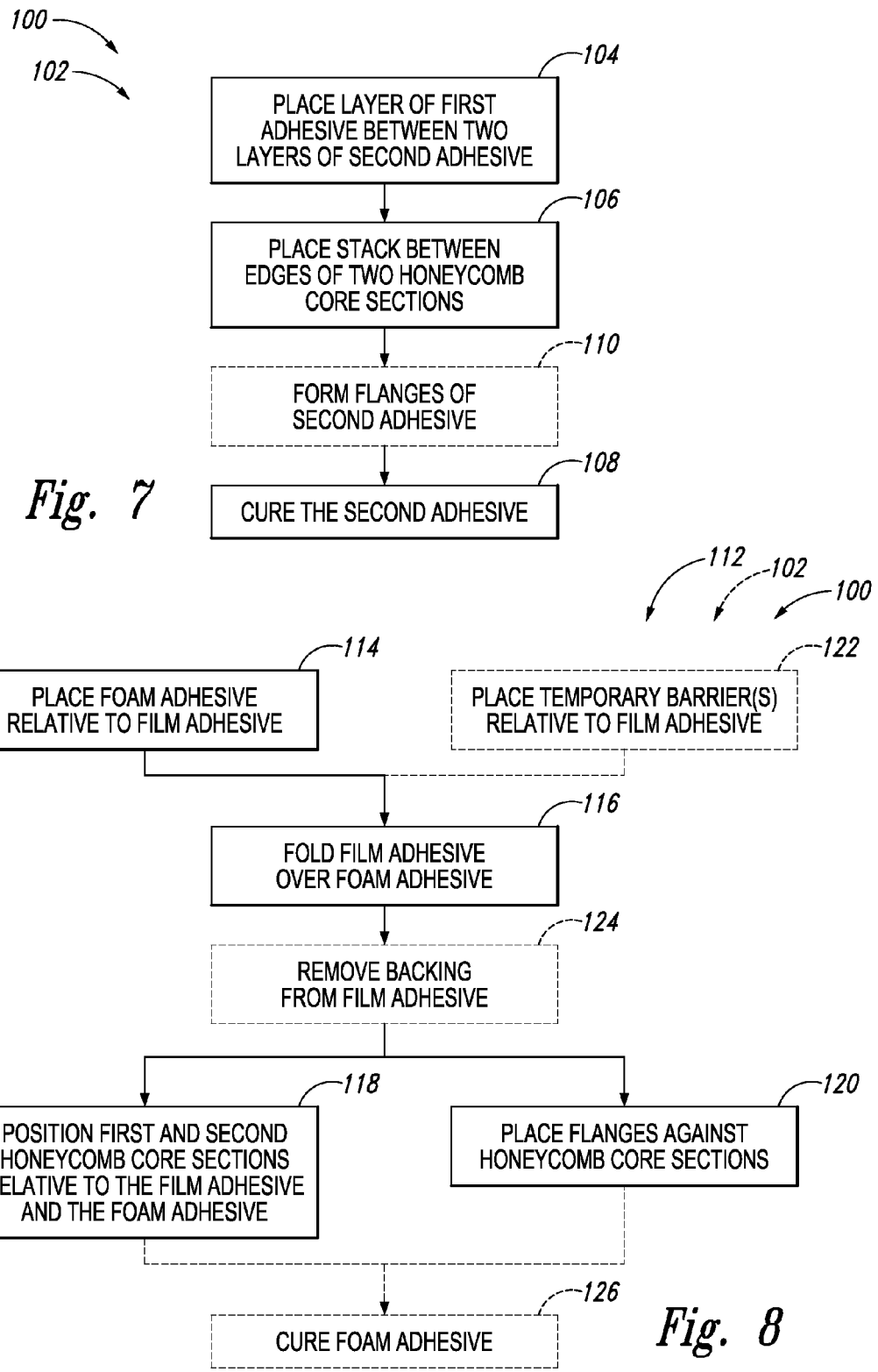

HONEYCOMB CORES WITH SPLICE JOINTS AND METHODS OF ASSEMBLING HONEYCOMB CORES

FIELD

The present disclosure relates to honeycomb cores, such as used in aerospace applications.

BACKGROUND

Honeycomb structures are often used in the construction of aircraft, because they have high strength to weight ratios. Depending on the specific location and application of a honeycomb structure in an aircraft, two or more honeycomb sections may be required and may be bonded together to define a larger honeycomb structure. In some applications, the joint between two adjacent honeycomb sections may affect characteristics of the honeycomb structure, including the structural integrity, as well as the acoustic properties, of the honeycomb structure.

SUMMARY

Honeycomb cores for use in aerospace applications and methods of assembling honeycomb cores are disclosed herein.

In some embodiments, a honeycomb core includes a first honeycomb core section, a second honeycomb core section, a sheet of film adhesive, and a foam adhesive. The first honeycomb core section defines a plurality of first cells and has a first edge that is generally aligned with the longitudinal axes of the first cells, and a first side that is generally perpendicular to the longitudinal axes of the first cells. The second honeycomb core section has a second edge that is generally aligned with the longitudinal axes of the second cells and that is positioned adjacent to and spaced apart from the first edge of the first honeycomb core section, and a second side that is generally perpendicular to the longitudinal axes of the second cells and that is generally aligned with the first side of the first honeycomb core section. The sheet of film adhesive includes a first portion that extends partially along the first side, a second portion that extends along the first edge, a third portion that extends along the second edge, and a fourth portion that extends partially along the second side. The first and fourth portions may be described as flanges of the sheet of film adhesive. The foam adhesive is positioned between the second portion and the third portion of the sheet of film adhesive.

Some methods of assembling honeycomb cores include (i) placing the foam adhesive relative to and engaged with the sheet of film adhesive so that the foam adhesive is adhered to the sheet of film adhesive; (ii) following the placing of the foam adhesive, folding the sheet of film adhesive over the foam adhesive so that two flanges are defined by the sheet of film adhesive, with the two flanges extending beyond and not adhered to the foam adhesive; (iii) following the folding, positioning the first honeycomb core section relative to the sheet of film adhesive and the foam adhesive so that the sheet of film adhesive is engaged with the first edge; (iv) following the folding, positioning the second honeycomb core section relative to the sheet of film adhesive and the foam adhesive so that the sheet of film adhesive is engaged with the second edge and so that the foam adhesive is positioned between the first edge and the second edge; (v) following the folding, placing a first of the two flanges against the first side; and (vi) following the folding, placing a second of the two flanges against the second side.

Some methods of assembling a honeycomb core from two honeycomb core sections include (i) placing a layer of a first adhesive between two layers of a second adhesive to define a stack, wherein the first adhesive is configured to expand to a greater extent than the second adhesive when heated; (ii) placing the stack between edges of two honeycomb core sections; and (iii) curing the first adhesive to expand the first adhesive so that the second adhesive operably adheres to the edges of the two honeycomb core sections.

BRIEF DESCRIPTION OF THE DRAWINGS

FIG. 3 is a fragmentary plan view of a honeycomb core including a splice joint according to the present disclosure.

FIG. 4 is a fragmentary profile view of an optional configuration of the honeycomb core of FIG. 3.

FIG. 7 is a flowchart schematically representing methods of assembling honeycomb cores according to the present disclosure.

FIG. 8 is another flowchart schematically representing methods of assembling honeycomb cores according to the present disclosure.

DESCRIPTION

Figure 1:
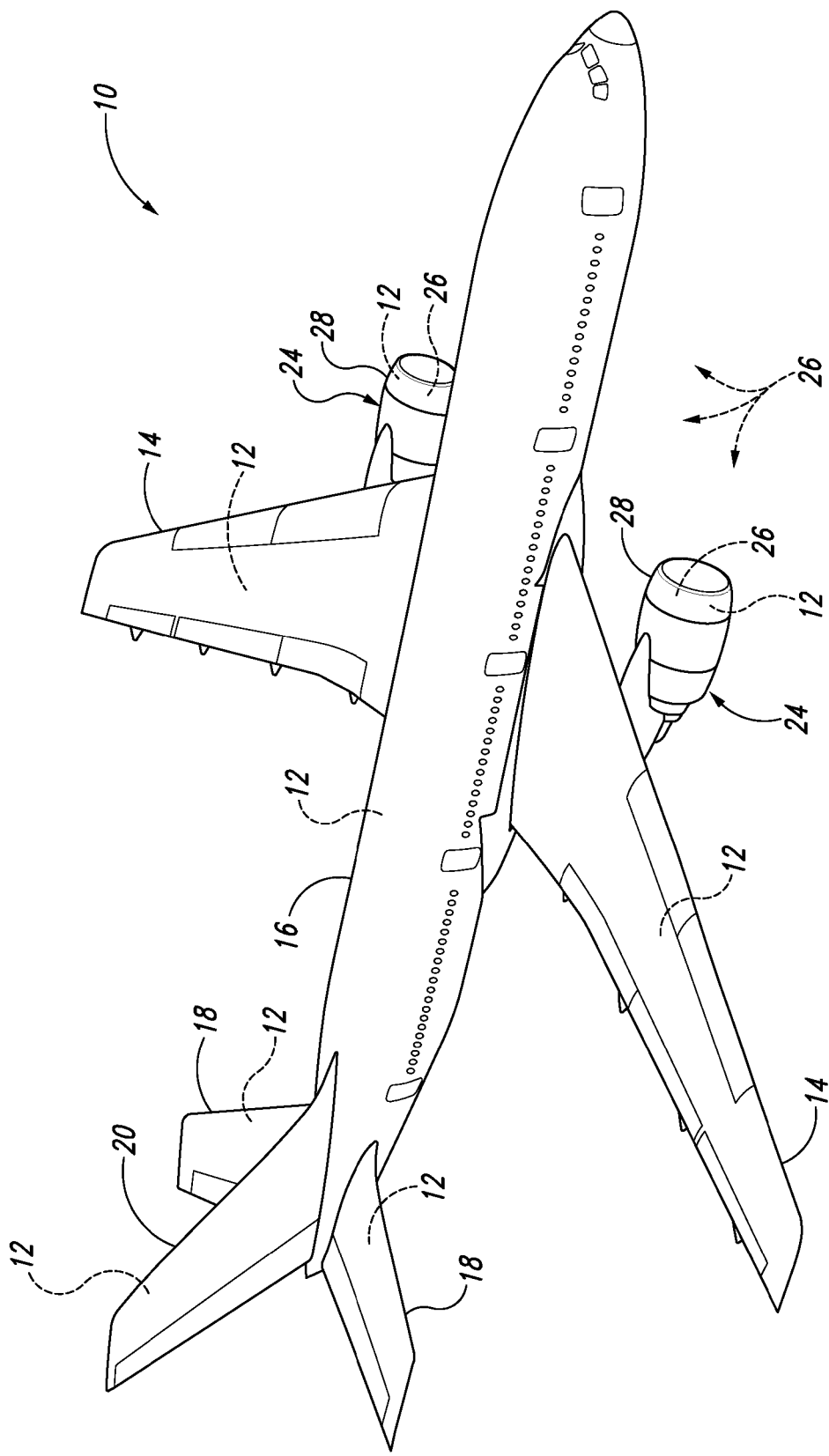
FIG. 1 is a perspective view of an illustrative, non-exclusive example of an aircraft.

Honeycomb cores for use in aerospace application, acoustic panels with honeycomb cores, inner acoustic barrels of aircraft engine inlets, aircraft, and methods of assembling honeycomb cores are disclosed herein. In FIG. 1, an example of an aircraft 10 is generally illustrated. Aircraft 10 may take any suitable form, including commercial aircraft, military aircraft, or any other suitable aircraft. While FIG. 1 illustrates an aircraft 10 in the form of a fixed wing aircraft, other types and configuration of aircraft are within the scope of aircraft 10 according to the present disclosure, including (but not limited to) rotorcraft and helicopters.

An aircraft 10 includes one or more honeycomb structures 12, which are structures that define a plurality of elongate cells, typically having hexagonal cross-sections, similar to honeycomb. Honeycomb structures are used in aerospace applications because of high strength to weight ratio. Typically, a honeycomb structure will include a skin on each side of the honeycomb structure. Accordingly, a honeycomb structure 12 additionally or alternatively may be described as a honeycomb core 12. As illustrative, non-exclusive examples, honeycomb cores may be utilized in such aircraft structures as wings 14, fuselages 16, horizontal stabilizers 18, vertical stabilizers 22, and engine housings 24; however, other components of aircraft 10 additionally or alternatively may include honeycomb cores 12.

Figure 2:
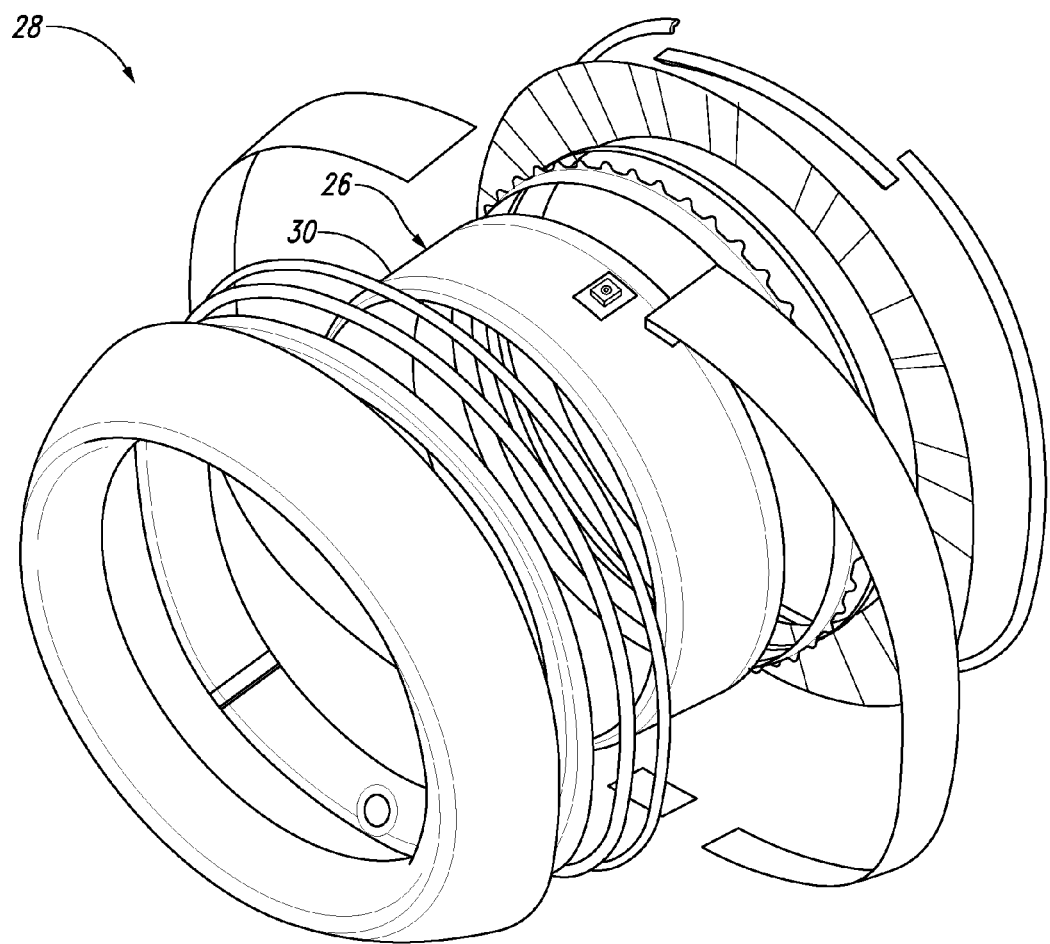
FIG. 2 is an isometric exploded view of an illustrative, non-exclusive example of an aircraft engine inlet, including an inner acoustic barrel.

In some applications, it may be desirable to utilize honeycomb cores within acoustic panels 26, which are structural elements of aircraft that are configured, or tuned, to filter specific wavelengths of sound. For example, the inlet 28 of an engine housing 24 of an aircraft may include an acoustic panel having a honeycomb core, with the acoustic panel being specifically designed and configured to filter noise associated with the fan of the engine, and thus to reduce the volume of noise that reaches passengers within the fuselage of the aircraft and persons outside the aircraft including those on the ground, etc. FIG. 2 provides an exploded view of an illustrative, non-exclusive example of an aircraft engine inlet 28 that includes an acoustic panel 26 in the form of an inner acoustic barrel 30. Other applications of acoustic panels also are within the scope of the present disclosure and may be utilized within aircraft 10.

Turning now to FIGS. 3-4, honeycomb cores 12 according to the present disclosure are schematically presented, FIG. 3 representing a plan view and FIG. 4 representing a profile view. As illustrated, a honeycomb core 12 includes at least two sections, denoted herein as a first honeycomb core section 40 and a second honeycomb core section 42, that are operatively joined together by a sheet of film adhesive 44, and a foam adhesive 46 to define a splice joint 48. Honeycomb cores assembled from two or more sections additionally or alternatively may be referred to as honeycomb segments, honeycomb blankets, and/or honeycomb assemblies.

Each honeycomb core section may be described as including a plurality of walls 50 that define a plurality of elongate cells 52. Walls 50 additionally or alternatively may be described as ligaments 50. In the schematic example of FIG. 3, the cells are hexagonal in cross-section; however, other shapes and configurations also may be used. Honeycomb core sections may be constructed from any suitable material, depending on the application therefore, including (but not limited to) aluminum, fiberglass, and fiber reinforced composite materials, such as aramid or carbon fiber reinforced polymers.

As mentioned, the first honeycomb core section 40 and the second honeycomb core section 42 are operatively joined together at a splice joint 48. More specifically, an edge 54 of the first honeycomb core structure is operatively joined to an edge 56 of the second honeycomb core section at the splice joint. As used herein, an 'edge' of a honeycomb core section refers to a side of the honeycomb core section that is generally aligned with the longitudinal axes of the cells 52, and generally is associated with the thickness of the honeycomb core section, in contrast to the sides of a honeycomb core sections that are generally perpendicular to the longitudinal axes of the cells. However, the edges 54, 56 are not defined by, and do not define, continuous surfaces along the edges of the honeycomb core sections. Rather, the edges are at least partially defined by portions of the walls 50 and the cells 52 that terminate at the respective edges of the honeycomb core sections. That is, each of the honeycomb core sections may be described as including a plurality of partial edge cells 59 that are spaced along a respective edge of a honeycomb core section.

Herein, the first honeycomb core section 40 also is described as including at least a side 58 that is generally perpendicular to the longitudinal axes of the cells and thus that is generally transverse to the edge 54 of the first honeycomb core section, and the second honeycomb core section 42 also is described as including at least a side 60 that is generally perpendicular to the longitudinal axes of the cells and thus that is generally transverse to the edge 56 of the second honeycomb core section, as indicated in FIG. 4. The sides 58, 60 are not defined by, and do not define, continuous surfaces, but rather are defined by the terminal ends of the walls 50 of the respective honeycomb core sections.

The film adhesive 44 includes a first portion 62 that extends partially along the side 58 of the first honeycomb core section 40, a second portion 64 that extends along the edge 54 of the first honeycomb core section, a third portion 66 that extends along the edge 56 of the second honeycomb core section 42, and a fourth portion 68 that extends partially along the side 60 of the second honeycomb core section. Portions 62 and 68 additionally or alternatively may be described as flanges 62, 68, because they extend at an angle relative to portions 64, 66 partially along the sides 58, 60 of the honeycomb core sections 40, 42.

The film adhesive 44 of a honeycomb core 12 may take any suitable form and be constructed of any suitable material, such that it is configured to operatively adhere, or otherwise be directly coupled to, the edges 54, 56 and the sides 58, 60 of the first and second honeycomb core sections 40, 42. As an illustrative, non-exclusive example, the film adhesive may include a resin layer supported on a carrier, such as a carrier that includes a support fabric of fiberglass, carbon fiber, or polymer (such as polyester or nylon) or a layer of pre-preg fabric. A pre-preg fabric includes fibers (e.g., carbon, fiberglass, aramid, etc.) that are pre-impregnated with an associated binding material. Typically, the binding material of pre-preg fabric is partially cured, or pre-cured, so as to permit handling of the fabric. Other illustrative, non-exclusive examples of suitable film adhesives include (but are not limited to) those including one or more of an epoxy, a bismaleimide, and a polyimide.

The foam adhesive 46 is positioned between the second portion 64 and the third portion 66 of the sheet of film adhesive 44, with a fifth portion 70 of the sheet of film adhesive defining a transition region between the second and third portions, as illustrated in FIG. 4. In some embodiments, the foam adhesive may be described as being sandwiched between the second and third portions of the film adhesive.

The foam adhesive 46 may take any suitable form and may be constructed from any suitable material. In some embodiments, the foam adhesive is an expanded foam adhesive, such as a cured foam adhesive. That is, as discussed in more detail herein, the foam adhesive, prior to assembly of a honeycomb core 12, may be configured to expand in thickness when heated. In other words, heating of an uncured foam adhesive may cause the foam adhesive to expand in thickness, thereby providing a motive force against the sheet of film adhesive, which is positioned on opposed sides of the foam adhesive.

Illustrative, non-exclusive examples of foam adhesives that may be utilized with a honeycomb core include (but are not limited to) epoxy-based foam adhesives, foam adhesives that are configured to expand up to 2-3 times in thickness when cured, open-cell foam adhesives, closed-cell foam adhesives, foam adhesives that meet Boeing Material Specification (BMS) 5-90, and Cytec™ FM 490 foaming epoxy adhesive.

The splice joint 48 of a honeycomb core 12 may have any suitable shape and configuration. For example, as generally schematically illustrated in FIG. 4, the edge 54 of the first honeycomb core section 40 may be generally parallel to the edge 56 of the second honeycomb core section 42. In some such embodiments, although not required, the edges may be generally parallel to the longitudinal axes of the cells 52, or at least to the cells 52 that are adjacent to the edges 54, 56 of the honeycomb core sections.

Figure 5:
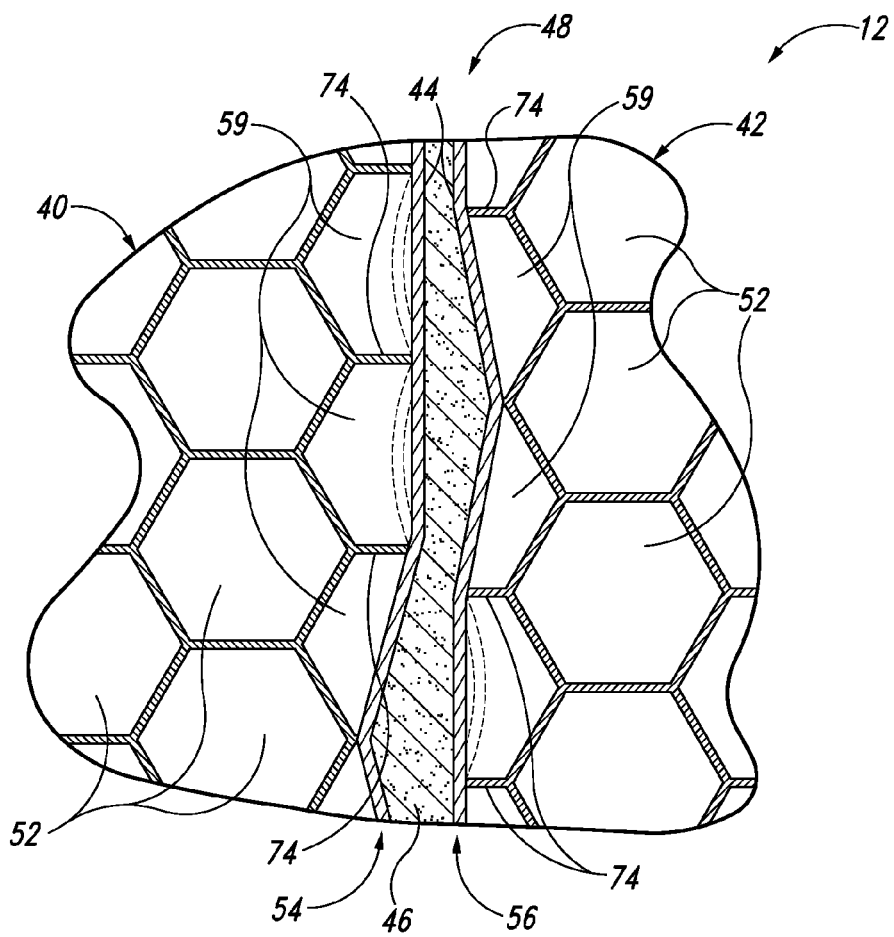
FIG. 5 is fragmentary profile view of another optional configuration of the honeycomb core of FIG. 3.

However, it also is within the scope of the present disclosure, that the edges 54, 56 are not parallel to each other and/or are not parallel to the longitudinal axes of the cells 52 of the respective honeycomb core sections. For example, FIG. 5 schematically illustrates another illustrative, non-exclusive example of a splice joint 48, in which the edge 54 is not parallel to the edge 56, and in which the edges 54, 56 are not parallel to the respective longitudinal axes of the cells 52. Also within the scope of the present disclosure are splice joints in which one of the two edges is generally parallel to the longitudinal axes of the cells, while the other of the two edges is not generally parallel to the longitudinal axes of the cells.

Additionally or alternatively, splice joints may vary in configuration along the length of the splice joint, for example, such that one cross-sectional profile is configured similar to the schematic representation of FIG. 4 and another cross-sectional profile is configured similar to the schematic representation of FIG. 5. For example, when creating a honeycomb core section from a larger honeycomb core structure, such as by cutting or other machining, the resulting edge may not be precisely planar. Additionally or alternatively, it is within the scope of the present disclosure that an edge may not be desired to be precisely planar, such as when creating honeycomb cores 12 that themselves are not intended to be precisely planar, such as that are used in a curved application or other contoured application, including applications in which the honeycomb core results in a complex contour in more than two dimensions.

In some embodiments, such as schematically and optionally illustrated in FIGS. 3-4 in dash-dot lines and as discussed in more detail herein, the foam adhesive 46 may protrude from or otherwise extend beyond the volume defined directly between the edges 54, 56 and the portions 64, 66 of the sheet of film adhesive. Moreover, as illustrated, the foam adhesive may extend at least partially on one or both of the first portion 62 and/or the fourth portion 68 of the sheet of film adhesive 44. Such a portion of foam adhesive may be described as a spill-over portion 72, because it may result during a curing process of the foam adhesive, in which the foam adhesive expands from between the edges of the honeycomb core sections and over and onto the flanges defined by the sheet of film adhesive. In such embodiments, the flanges of the sheet of film adhesive may prevent, or at least restrict, the foam adhesive from spilling into, or otherwise entering, internal volumes of one or more cells 52 of the honeycomb core sections. Depending on the ultimate application of the honeycomb core, a spill-over portion may be maintained in place or it may be selectively removed, such as to configure a surface for subsequent attachment of a skin or other structure.

Figure 6:
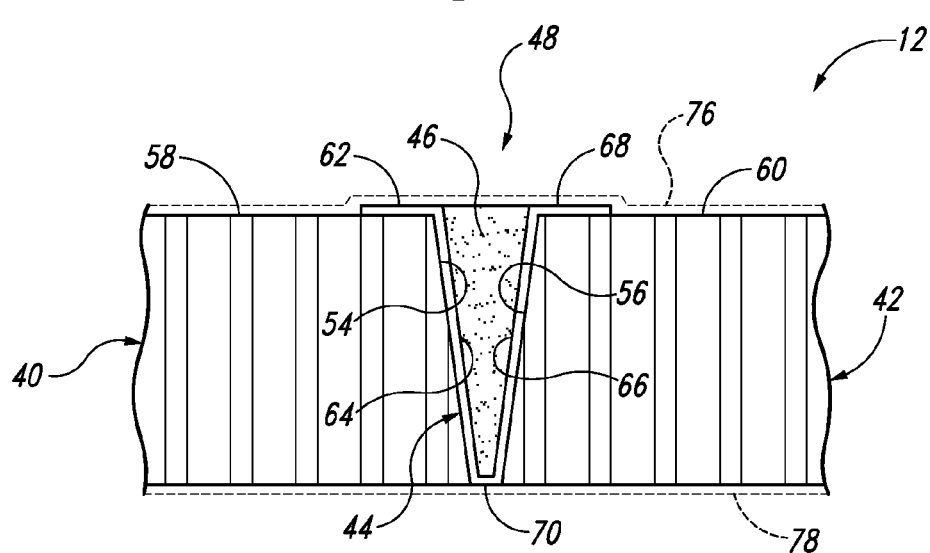
FIG. 6 illustrates in cross-section possible defects in adjoining honeycomb core sections and a corresponding splice joint according to the present disclosure.

With reference to the illustrative, non-exclusive example of a honeycomb core 12 illustrated in cross-section in FIG. 6, the edges of the honeycomb core sections may be described as being defined by a plurality of edge ligaments, or edge walls, 74. However, when creating a honeycomb core section from a larger honeycomb core structure, such as by cutting or other machining, the edge ligaments may vary in width, and in some cases, may even be missing, depending on the process used to create the honeycomb core sections. Accordingly, in some embodiments, the plurality of edge ligaments that span an edge of a honeycomb core section may be described as having different dimensions. Additionally or alternatively, in embodiments, in which one or more edge ligaments are absent all together, the plurality of edge ligaments may be described as being not uniformly spaced along, and/or as not being aligned along, the edge of the honeycomb core section.

Additionally or alternatively, in some embodiments, the edges of honeycomb core sections may be defined by a plurality of partial edge cells 59 with at least one partial edge cell having a different configuration than at least one other partial edge cell. This optional configuration is illustrated in FIG. 6 with respect to both edges 54, 56. That is, in the example illustrated, an edge ligament is missing from at least one location between adjacent partial edge cells on both of the two edges, resulting in different shapes and sizes of partial edge cells.

In such embodiments of honeycomb cores 12 including different dimensioned edge walls and/or differently configured partial edge cells, the sheet of film adhesive 44 may not be planar along the one or both of the edges of the honeycomb core sections, such as illustrated in the example of FIG. 6. Moreover, in such embodiments, the foam adhesive 46 varies in thickness between the first edge and the second edge. Stated differently, in such embodiments, the foam adhesive varies in thickness along the splice joint 48.

In some embodiments of honeycomb cores 12, at least a subset of the partial edge cells 59 of a honeycomb core section may not fully be filled with the sheet of film adhesive 44 and the foam adhesive 46. Stated differently, in some embodiments, at least a subset of partial edge cells and the sheet of film adhesive may define voids between the walls of partial edge cells and the sheet of film adhesive. In other words, in some embodiments, the film adhesive and the foam adhesive do not fully fill the partial edge cells.

In some embodiments, such as optionally illustrated in FIG. 6 in dashed lines, the sheet of film adhesive 44 may generally undulate along an edge of a honeycomb core section, such that the sheet of film adhesive extends partially into at least a subset of partial first cells. Such a configuration may be the result of the curing of the foam adhesive, which, in some embodiments, as discussed herein, is configured to expand when subjected to heat. As a result of the expansion of the foam adhesive, and depending on the properties of the film adhesive, the film adhesive may be forced to pucker, or otherwise bulge or expand, into the partial edge cells of a honeycomb core section.

As discussed, in some applications, it may be desirable to utilize a honeycomb core 12 with such structural elements of an aircraft as acoustic panels. Accordingly, as schematically and optionally illustrated in FIGS. 4 and 5, a honeycomb core may include a skin 76 that is operatively attached to the sides 58, 60 of the honeycomb core sections 40, 42, also extending over the flanges 62, 68 of the sheet of film adhesive. A honeycomb core also may include a skin 78 that is operatively coupled to the honeycomb core sections opposite the sides 58, 60 thereof. In some such embodiments, such as when the honeycomb core is utilized as an acoustic panel, one of the skins 76, 78 may be free of perforations, while the other of the skins defines a plurality of perforations. In some embodiments, the acoustic panel may be tuned for a predetermined purpose, such as for installation as an inner acoustic barrel of an aircraft engine inlet; however, other applications also are within the scope of the present disclosure.

FIGS. 7-8 schematically provide flowcharts that represent illustrative, non-exclusive examples of methods 100 of assembling honeycomb cores, or segments, from at least two honeycomb core sections. In these flowcharts, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 7-8 are not limiting and other methods and steps are within the scope of the present disclosure, including methods having greater than or fewer than the number of steps illustrated, as understood from the discussions herein. Moreover, honeycomb cores 12 according to the present disclosure are not required to be assembled utilizing a method 100 according to the present disclosure, and a method 100 is not required to result in a honeycomb core 12 according to the present disclosure, as other configurations of honeycomb cores and structures also may be assembled utilizing a method 100.

Beginning with FIG. 7, a first set of methods 100, indicated methods 102, may include placing a layer of a first adhesive between two layers of a second adhesive to define a stack, as indicated at 104, placing the stack between edges of two honeycomb core sections, as indicated at 106, and then curing the second adhesive, as indicated at 108. In such methods, the first adhesive is configured to expand to a greater extent than the second adhesive when heated. Accordingly, the curing 108 results in the first adhesive expanding, so that the second adhesive operably adheres to the edges of the two honeycomb core sections. As illustrative, non-exclusive examples, the first adhesive may be a foam adhesive, such as discussed herein, and the second adhesive may be a film adhesive, such as discussed herein.

In some methods 102, although not required, the placing 104 may include wrapping, or folding, the second adhesive around three sides of the first adhesive. Additionally or alternatively, the placing 104 may include, and/or may be described as, sandwiching the first adhesive between portions of the second adhesive.

As optionally indicated in FIG. 7, a method 102 also may include forming two flanges of the second adhesive over sides of the two honeycomb core sections to prevent the first adhesive from entering cells of the two honeycomb core sections during the curing step, as indicated at 110.

Figure 9:
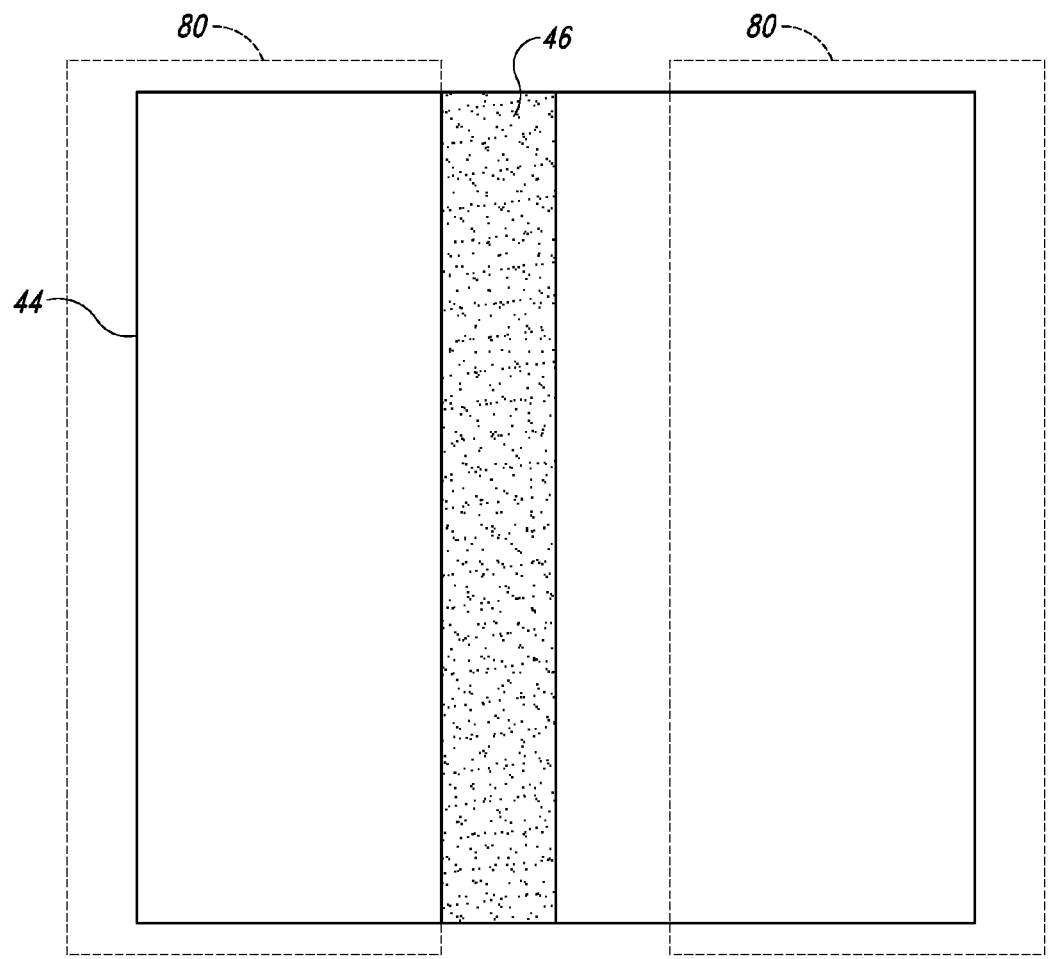
FIG. 9 is a plan view showing placement of a foam adhesive relative to a film adhesive as a step of a method according to the present disclosure.
Figure 10:
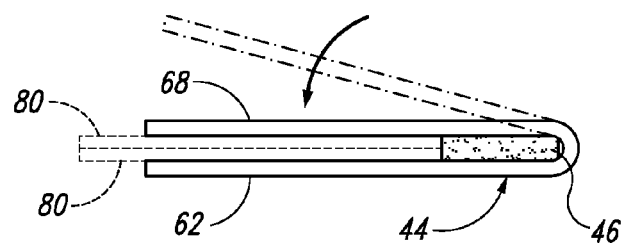
FIG. 10 is a profile view showing the folding of the film adhesive over the foam adhesive of FIG. 9 as a step of a method according to the present disclosure.
Figure 11:
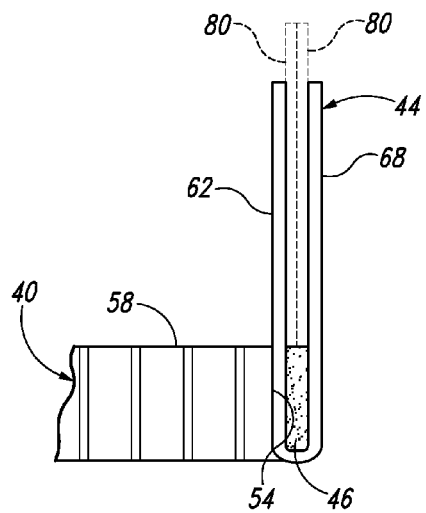
FIG. 11 is a profile view showing placement of the film adhesive of FIG. 9 against an edge of a first honeycomb core section as a step of a method according to the present disclosure.
Figure 12:
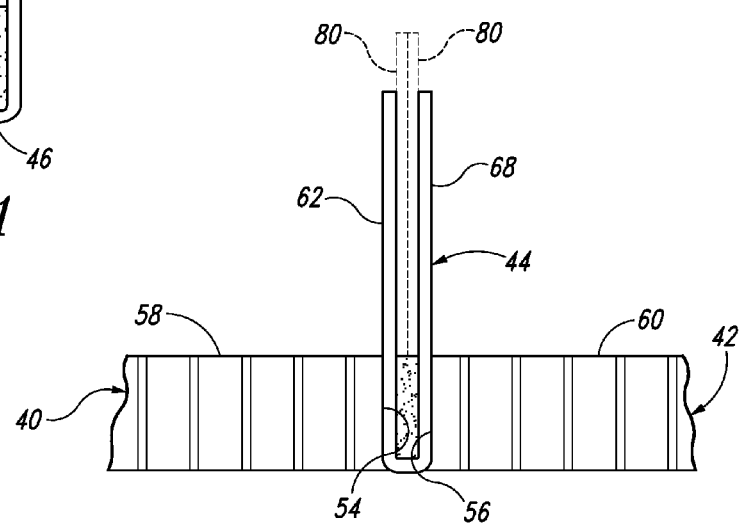
FIG. 12 is a profile view showing placement of the film adhesive of FIG. 9 against an edge of a second honeycomb core section as a step of a method according to the present disclosure.
Figure 13:
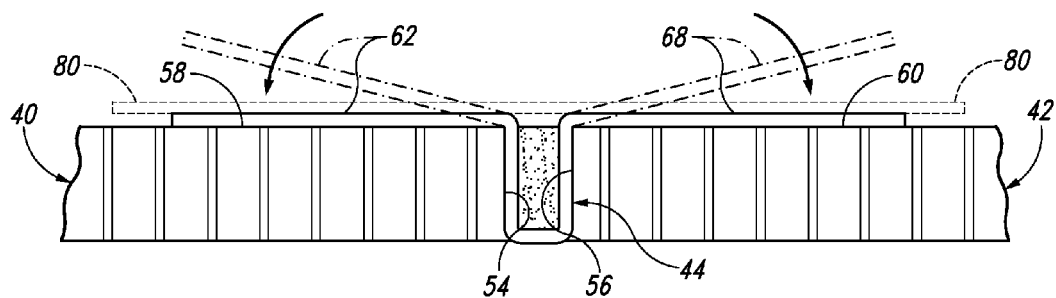
FIG. 13 is a profile view showing placement of flanges defined by the film adhesive of FIG. 9 against the honeycomb core sections as a step of a method according to the present disclosure.

With reference now to FIG. 8, a second set of methods 100, indicated as methods 112, are schematically represented. A method 112 is an example of a method 100 that may be utilized to construct a honeycomb core 12 according to the present disclosure. As generally illustrated in FIG. 8 and with reference to FIGS. 9-13, a method 112 includes (i) placing the foam adhesive 46 relative to and engaged with the sheet of film adhesive 44 so that the foam adhesive is adhered to the sheet of film adhesive, as indicated at 114 in FIG. 8 and as schematically illustrated in FIG. 9; (ii) following the placing 114, folding the sheet of film adhesive over the foam adhesive so that two flanges 62, 68 are defined by the sheet of film adhesive, with the two flanges extending beyond and not adhered to the foam adhesive, as indicated at 116 in FIG. 8 and as schematically illustrated in FIG. 10; (iii) following the folding 116, positioning the first honeycomb core section 40 relative to the sheet of film adhesive and the foam adhesive so that the sheet of film adhesive is engaged with the edge 54 of the first honeycomb core section, as indicated at 118 in FIG. 8 and as schematically illustrated in FIG. 11; (iv) also following the folding 116, positioning the second honey core section 42 relative to the sheet of film adhesive and the foam adhesive so that the sheet of film adhesive is engaged with the edge 56 of the second honeycomb core section and so that the foam adhesive is positioned between the edges 54, 56, as also indicated at 118 in FIG. 8 and as schematically illustrated in FIG. 12; and (v) also following the folding 116, placing flanges 62, 68 against sides 58, 60, respectively of the first and second honeycomb core sections, as indicated at 120 in FIG. 8 and as schematically illustrated in FIG. 13.

As optionally indicated in FIG. 8, a method 112 also may include prior to the folding 116, placing one or more temporary barrier 80 relative to the sheet of film adhesive 44, covering one or both of the regions of the sheet of film adhesive that become one or both of the two flanges 62, 68 following the folding 116 to prevent the two flanges from adhering together, as indicated at 122 and as schematically and optionally illustrated in FIG. 9. For example, as understood with reference to FIG. 10, one or two temporary barriers 80 will separate the two flanges 62, 68, thereby preventing them from adhering together. Illustrative, non-exclusive examples of suitable temporary barriers include (but are not limited to) nonstick and nonwetting films, such as constructed of fluorinated ethylene propylene.

In some methods 112, such as represented in FIG. 9, two temporary barriers 80 may be separately placed relative to the two regions of the sheet of film adhesive that will become the two flanges 62, 68. However, it also is within the scope of the present disclosure that two temporary barriers may both be placed, that is stacked, relative to the sheet of film adhesive to cover a single region of the sheet of film adhesive that becomes one of the two flanges. Then, when the sheet of film adhesive is folded over the foam adhesive, the other of the two flanges may be positioned against one of the temporary barriers. Other ways of appropriately preventing the two flanges 62, 68 from sticking together also may be implemented in a method 112 according to the present disclosure.

After the flanges 62, 68 have been operably adhered to the sides 58, 60 of the honeycomb core sections 40, 42, the temporary barriers 80 may be removed, for example, for subsequent attachment of a skin to the honeycomb core.

In some methods 112, the film adhesive 44 may include a temporary backing, or carrier, that is temporarily adhered to one side of the film adhesive. Accordingly, some methods 112 may further include prior to the positioning 118, removing a backing from the sheet of film adhesive at least within the regions of the sheet of film adhesive that become engaged with the edges 54, 56 of the first and second honeycomb core sections, respectively, to permit adhesion of the sheet of film adhesive to the edges, as indicated at 124 in FIG. 8.

Next, as indicated at 126 in FIG. 8, some methods 112 also may include following the positioning 118 and the placing 120, curing the foam adhesive 46 so that it expands between the edges 54, 56. In some such methods, during the curing 126, the two flanges 62, 68 restrict the foam adhesive from entering the cells of the first and second honeycomb core sections via the sides 58, 60 thereof. Moreover, in some such methods, the curing results in the sheet of film adhesive operably adhering to the edges 54, 56 of the honeycomb core sections. Additionally or alternatively, in some methods, the curing results in the sheet of film adhesive extending only partially into at least a subset of the plurality of partial edge cells 59, such previously discussed and optionally illustrated in FIG. 6.

In some methods 112, the curing may be described as, or as including, expanding the foam adhesive 46 to operably adhere the sheet of film adhesive 44 to the edges 54, 56 of the honeycomb core sections. Additionally or alternatively, in some methods 112, the curing may be described as, or as including, expanding the foam adhesive to provide a motive force for contact between the sheet of film adhesive and the edges 54, 56 of the honeycomb core sections.

Illustrative, non-exclusive examples of inventive subject matter according to the present disclosure are described in the following enumerated paragraphs:

A. A honeycomb core for use in an aerospace application, the honeycomb core comprising:

a first honeycomb core section defining a plurality of first cells, wherein the first honeycomb core section has (i) a first edge generally aligned with longitudinal axes of the first cells, and (ii) a first side generally perpendicular to the longitudinal axes of the first cells;

a second honeycomb core section defining a plurality of second cells, wherein the second honeycomb core section has (i) a second edge generally aligned with longitudinal axes of the second cells and positioned adjacent to and spaced apart from the first edge, and (ii) a second side generally perpendicular to the longitudinal axes of the second cells and generally aligned with the first side;

a sheet of film adhesive including a first portion extending partially along the first side, a second portion extending along the first edge, a third portion extending along the second edge, and a fourth portion extending partially along the second side; and a foam adhesive positioned between the second portion and the third portion of the sheet of film adhesive.

A1. The honeycomb core of paragraph A, wherein the first honeycomb core section and the second honeycomb core section are constructed of one or more of aluminum, fiberglass, or fiber reinforced composite material.

A2. The honeycomb core of any of paragraphs A-A1, wherein the film adhesive includes an adhesive layer supported on a carrier, wherein the adhesive layer is adhered to the first honeycomb core section and the second honeycomb core section and the carrier is adhered to the adhesive foam, optionally wherein the carrier includes a support fabric of fiberglass or carbon fiber, and optionally wherein the carrier includes a layer of pre-preg fabric.

A3. The honeycomb core of any of paragraphs A-A2, wherein the foam adhesive includes an expanded foam adhesive, a cured foam adhesive, an epoxy-based foam adhesive, an open-cell foam adhesive, a closed-cell foam adhesive, and/or a foam adhesive that meets Boeing Material Specification (BMS) 5-90.

A4. The honeycomb core of any of paragraphs A-A3, wherein the first edge is generally parallel to the second edge.

A5. The honeycomb core of any of paragraphs A-A4, wherein the first edge is generally parallel to the longitudinal axes of the first cells.

A6. The honeycomb core of any of paragraphs A-A5, wherein the second edge is generally parallel to the longitudinal axes of the second cells.

A7. The honeycomb core of any of paragraphs A-A3, wherein the first edge is at an angle relative to the longitudinal axes of the first cells.

A8. The honeycomb core of any of paragraphs A-A3 and A7, wherein the second edge is at an angle relative to the longitudinal axes of the second cells.

A9. The honeycomb core of any of paragraphs A-A3 and A7-A8, wherein the first edge is at an angle relative to the second edge.

A10. The honeycomb core of any of paragraphs A-A9, wherein the foam adhesive extends at least partially on a portion of the sheet of film adhesive that extends partially along the first side.

A11. The honeycomb core of any of paragraphs A-A10, wherein the foam adhesive extends at least partially on a portion of the sheet of film adhesive that extends partially along the second side.

A12. The honeycomb core of any of paragraphs A-A11,
wherein the first edge is defined by a plurality of first edge ligaments; and
wherein (i) the plurality of first edge ligaments includes ligaments of different dimensions, and/or (ii) the plurality of first edge ligaments are not uniformly spaced along the first edge.

A13. The honeycomb core of any of paragraphs A-A12,
wherein the second edge is defined by a plurality of second edge ligaments; and
wherein (i) the plurality of second edge ligaments includes ligaments of different dimensions, and/or (ii) the plurality of second edge ligaments are not uniformly spaced along the second edge.

A14. The honeycomb core of any of paragraphs A-A13, wherein the sheet of film adhesive is not planar along the first edge.

A15. The honeycomb core of any of paragraphs A-A14, wherein the sheet of film adhesive is not planar along the second edge.

A16. The honeycomb core of any of paragraphs A-A15, wherein the first edge is defined by a plurality of partial first edge cells, and wherein at least one partial first edge cell has a different configuration than at least one other partial first edge cell.

A17. The honeycomb core of any of paragraphs A-A16, wherein the second edge is defined by a plurality of partial second edge cells, and wherein at least one partial second edge cell has a different configuration than at least one other partial second edge cell.

A18. The honeycomb core of any of paragraphs A-A17, wherein the foam adhesive varies in thickness between the first edge and the second edge.

A19. The honeycomb core of any of paragraphs A-A18, wherein the first edge is defined by a plurality of partial first edge cells, and wherein at least a subset of the plurality of partial first edge cells is not fully filled with the sheet of film adhesive and the foam adhesive, or wherein walls of at least a subset of the plurality of partial first edge cells and the sheet of film adhesive define voids between the walls of the subset of the plurality of partial first edge cells and the sheet of film adhesive.

A20. The honeycomb core of any of paragraphs A-A19, wherein the second edge is defined by a plurality of partial second edge cells, and wherein at least a subset of the plurality of partial second edge cells is not fully filled with the sheet of film adhesive and the foam adhesive, or wherein walls of at least a subset of the plurality of partial second edge cells and the sheet of film adhesive define voids between the walls of the subset of the plurality of partial second edge cells and the sheet of film adhesive.

A21. The honeycomb core of any of paragraphs A-A20, wherein the first edge is defined by a plurality of partial first edge cells, and wherein the sheet of film adhesive undulates along the first edge, extending partially into at least a subset of the plurality of partial first edge cells.

A22. The honeycomb core of any of paragraphs A-A21, wherein the second edge is defined by a plurality of partial second edge cells, and wherein the sheet of film adhesive undulates along the second edge, extending partially into at least a subset of the plurality of partial second edge cells.

A23. An acoustic panel, comprising:
the honeycomb core of any of paragraphs A-A22;

a first skin operatively coupled to the first side and the second side; and a second skin operatively coupled to the first honeycomb core section and the second honeycomb core section opposite of the first side and the second side.

A23.1. The acoustic panel of paragraph A23, wherein one of the first skin and the second skin is free of perforations.

A23.2. The acoustic panel of any of paragraphs A23-A23.1, wherein one of the first skin and the second skin defines a plurality of perforations.

A23.3. The acoustic panel of any of paragraphs A23-A23.2, wherein the acoustic panel is tuned for a predetermined purpose, optionally wherein the predetermined purpose is for installation as an inner acoustic barrel of an aircraft engine inlet.

A24. An inner acoustic barrel of an aircraft engine inlet, the inner acoustic barrel comprising the acoustic panel of any of paragraphs A23-A23.3.

A25. An aircraft, comprising:
a fuselage;
optionally a wing supported by the fuselage; and
at least one engine;
wherein the aircraft includes the subject matter of any of paragraphs A-A24.

B. A method of assembling a honeycomb core from at least two honeycomb core sections, the method comprising:
placing a layer of a first adhesive between two layers of a second adhesive to define a stack, wherein the first adhesive is configured to expand to a greater extent than the second adhesive when heated;
placing the stack between edges of two honeycomb core sections; and
curing the first adhesive to expand the first adhesive so that the second adhesive operably adheres to the edges of the two honeycomb core sections.

B1. The method of paragraph B, further comprising:
forming two flanges of the second adhesive over sides of the two honeycomb core sections to prevent the first adhesive from entering cells of the two honeycomb core sections.

B2. The method of any of paragraphs B-B1, wherein the placing the layer of the first adhesive between two layers of the second adhesive includes wrapping the second adhesive around three sides of the first adhesive.

B3. The method of any of paragraphs B-B2, wherein the first adhesive is a foam adhesive and the second adhesive is a film adhesive.

B4. The method of any of paragraphs B-B3, resulting in the subject matter of any of paragraphs A-A25.

B5. The method of any of paragraphs B-B4, further comprising the subject matter of any of paragraphs C-C5.5.

C. A method of assembling the honeycomb core of any of paragraphs A-A22 or the acoustic panel of any of paragraphs A23-A23.3, the method comprising:
placing the foam adhesive relative to and engaged with the sheet of film adhesive so that the foam adhesive is adhered to the sheet of film adhesive;
following the placing the foam adhesive, folding the sheet of film adhesive over the foam adhesive so that two flanges are defined by the sheet of film adhesive, with the two flanges extending beyond and not adhered to the foam adhesive;
following the folding, positioning the first honeycomb core section relative to the sheet of film adhesive and the foam adhesive so that the sheet of film adhesive is engaged with the first edge;
following the folding, positioning the second honeycomb core section relative to the sheet of film adhesive and the foam adhesive so that the sheet of film adhesive is engaged with the second edge and so that the foam adhesive is positioned between the first edge and the second edge;

following the folding, placing a first of the two flanges against the first side; and following the folding, placing a second of the two flanges against the second side.

C1. The method of paragraph C, further comprising:
prior to the folding, placing a temporary barrier relative to the sheet of film adhesive covering a region of the sheet of film adhesive that becomes one of the two flanges following the folding to prevent the two flanges from adhering together.

C2. The method of paragraph C, further comprising:
prior to the folding, placing two temporary barriers relative to the sheet of film adhesive to cover a region of the sheet of film adhesive that becomes one of the two flanges following the folding to prevent the two flanges from adhering together;
wherein the folding includes positioning the other of the two flanges against one of the temporary barriers.

C3. The method of paragraph C, further comprising:
prior to the folding, placing a first temporary barrier relative to the sheet of film adhesive to cover a region of the sheet of film adhesive that becomes one of the two flanges following the folding; and
prior to the folding, placing a second temporary barrier relative to the sheet of film adhesive to cover a region of the sheet of film adhesive that becomes the other of the two flanges following the folding.

C4. The method of any of paragraphs C-C3, further comprising:
prior to the positioning the first honeycomb core section, removing a backing from the sheet of film adhesive at least within a region of the sheet of film adhesive that becomes engaged with the first edge to permit adhesion of the sheet of film adhesive to the first edge; and
prior to the positioning the second honeycomb core section, removing the backing from the sheet of film adhesive at least within a region of the sheet of film adhesive that becomes engaged with the second edge to permit adhesion of the sheet of film adhesive to the second edge.

C5. The method of any of paragraphs C-C4, further comprising:
following the positioning the first honeycomb core section, the positioning the second honeycomb core section, the placing the first of the two flanges, and the placing of the second of the two flanges, curing the foam adhesive so that it expands between the first edge and the second edge.

C5.1. The method of paragraph C5, wherein during the curing, the two flanges restrict the foam adhesive from entering the first cells from the first side and the second cells from the second side.

C5.2. The method of any of paragraphs C5-C5.1, wherein the curing results in the sheet of film adhesive operably adhering to the first edge and the second edge.

C5.3. The method of any of paragraphs C5-C5.2, wherein the first edge is defined by a plurality of partial first edge cells and the second edge is defined by a plurality of partial second edge cells, and wherein the curing results in the sheet of film adhesive extending only partially into at least a subset of the plurality of partial first edge cells and the plurality of partial second edge cells.

C5.4. The method of any of paragraphs C5-C5.3, wherein the curing includes expanding the foam adhesive to operably adhere the sheet of film adhesive to the first edge and the second edge.

C5.5. The method of any of paragraphs C5-C5.4, wherein the curing includes expanding the foam adhesive to provide a motive force for contact between the sheet of film adhesive and the first edge and the second edge.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A honeycomb core for use in an aerospace application, the honeycomb core comprising:
   a first honeycomb core section defining a plurality of first cells, wherein the first honeycomb core section has (i) a first edge generally aligned with longitudinal axes of the first cells, and (ii) a first side generally perpendicular to the longitudinal axes of the first cells;
   a second honeycomb core section defining a plurality of second cells, wherein the second honeycomb core section has (i) a second edge generally aligned with longitudinal axes of the second cells and positioned adjacent to and spaced apart from the first edge, and (ii) a second side generally perpendicular to the longitudinal axes of the second cells and generally aligned with the first side;
   a sheet of film adhesive including a first portion extending partially along the first side, a second portion extending along the first edge, a third portion extending along the second edge, and a fourth portion extending partially along the second side; and
   a foam adhesive positioned between the second portion and the third portion of the sheet of film adhesive.

2. The honeycomb core of claim 1, wherein the first edge is generally parallel to the second edge.

3. The honeycomb core of claim 1, wherein the first edge is generally parallel to the longitudinal axes of the first cells.

4. The honeycomb core of claim 1, wherein the second edge is generally parallel to the longitudinal axes of the second cells.

5. The honeycomb core of claim 1, wherein the first edge is at an angle relative to the longitudinal axes of the first cells.

6. The honeycomb core of claim 1, wherein the second edge is at an angle relative to the longitudinal axes of the second cells.

7. The honeycomb core of claim 1, wherein the first edge is at an angle relative to the second edge.

8. The honeycomb core of claim 1, wherein the foam adhesive extends at least partially on a portion of the sheet of film adhesive that extends partially along the first side.

9. The honeycomb core of claim 1,
   wherein the first edge is defined by a plurality of first edge ligaments; and
   wherein (i) the plurality of first edge ligaments includes ligaments of different dimensions, and/or (ii) the plurality of first edge ligaments are not uniformly spaced along the first edge.

10. The honeycomb core of claim 1, wherein the sheet of film adhesive is not planar along the first edge.

11. The honeycomb core of claim 10, wherein the sheet of film adhesive is not planar along the second edge.

12. The honeycomb core of claim 1, wherein the first edge is defined by a plurality of partial first edge cells, and wherein at least one partial first edge cell has a different configuration than at least one other partial first edge cell.

13. The honeycomb core of claim 1, wherein the foam adhesive varies in thickness between the first edge and the second edge.

14. The honeycomb core of claim 1,
   wherein the first edge is defined by a plurality of partial first edge cells, and wherein walls of at least a subset of the plurality of partial first edge cells and the sheet of film adhesive define voids between the walls of the subset of the plurality of partial first edge cells and the sheet of film adhesive; and
   wherein the second edge is defined by a plurality of partial second edge cells, and wherein walls of at least a subset of the plurality of partial second edge cells and the sheet of film adhesive define voids between the walls of the subset of the plurality of partial second edge cells and the sheet of film adhesive.

15. The honeycomb core of claim 1,
   wherein the first edge is defined by a plurality of partial first edge cells, and wherein the sheet of film adhesive undulates along the first edge, extending partially into at least a subset of the plurality of partial first edge cells; and
   wherein the second edge is defined by a plurality of partial second edge cells, and wherein the sheet of film adhesive undulates along the second edge, extending partially into at least a subset of the plurality of partial second edge cells.

16. An acoustic panel, comprising:
   the honeycomb core of claim 1;
   a first skin operatively coupled to the first side and the second side; and
   a second skin operatively coupled to the first honeycomb core section and the second honeycomb core section opposite of the first side and the second side;
   wherein one of the first skin and the second skin is free of perforations, and wherein the other of the first skin and the second skin defines a plurality of perforations.

17. The acoustic panel of claim 16, wherein the acoustic panel is tuned for a predetermined purpose.

18. An inner acoustic barrel of an aircraft engine inlet, the inner acoustic barrel comprising the acoustic panel of claim 16.

19. An aircraft, comprising:
   a fuselage;
   a wing supported by the fuselage;
   at least one engine; and
   the honeycomb core of claim 1.

20. A method of assembling the honeycomb core of claim 1, the method comprising:
   placing the foam adhesive relative to and engaged with the sheet of film adhesive so that the foam adhesive is adhered to the sheet of film adhesive;
   following the placing the foam adhesive, folding the sheet of film adhesive over the foam adhesive so that two flanges are defined by the sheet of film adhesive, with the two flanges extending beyond and not adhered to the foam adhesive;
   following the folding, positioning the first honeycomb core section relative to the sheet of film adhesive and the foam adhesive so that the sheet of film adhesive is engaged with the first edge;
   following the folding, positioning the second honeycomb core section relative to the sheet of film adhesive and the foam adhesive so that the sheet of film adhesive is engaged with the second edge and so that the foam adhesive is positioned between the first edge and the second edge;
   following the folding, placing a first of the two flanges against the first side; and
   following the folding, placing a second of the two flanges against the second side.

* * * * *